US012570794B2

(12) United States Patent
Park et al.

(10) Patent No.: US 12,570,794 B2
(45) Date of Patent: Mar. 10, 2026

(54) METHOD FOR PRODUCING BIODEGRADABLE POLYMER COMPLEX AND BIODEGRADABLE POLYMER COMPLEX

(71) Applicant: LG CHEM, LTD., Seoul (KR)

(72) Inventors: Jae Hyeong Park, Daejeon (KR); Sung Hoon Hwang, Daejeon (KR); Jeongmin Lee, Daejeon (KR); Seungtaek Oh, Daejeon (KR)

(73) Assignee: LG CHEM, LTD., Seoul (KR)

(*) Notice: Subject to any disclaimer, the term of this patent is extended or adjusted under 35 U.S.C. 154(b) by 578 days.

(21) Appl. No.: 18/032,089

(22) PCT Filed: Oct. 26, 2021

(86) PCT No.: PCT/KR2021/015083
§ 371 (c)(1),
(2) Date: Apr. 14, 2023

(87) PCT Pub. No.: WO2022/092758
PCT Pub. Date: May 5, 2022

(65) Prior Publication Data
US 2023/0391947 A1     Dec. 7, 2023

(30) Foreign Application Priority Data

Oct. 26, 2020    (KR) ........................ 10-2020-0139328
Oct. 25, 2021    (KR) ........................ 10-2021-0143059

(51) Int. Cl.
*C08G 63/183*          (2006.01)
*C08G 63/20*           (2006.01)
*C08G 63/85*           (2006.01)

(52) U.S. Cl.
CPC ........... *C08G 63/183* (2013.01); *C08G 63/20* (2013.01); *C08G 63/85* (2013.01); *C08G 2230/00* (2013.01)

(58) Field of Classification Search
CPC .... C08G 63/183; C08G 63/85; C08G 63/672; C08L 67/02; C08L 2201/06
See application file for complete search history.

(56) References Cited

U.S. PATENT DOCUMENTS

| | | | |
|---|---|---|---|
| 6,207,775 B1 | 3/2001 | Marti et al. | |
| 8,604,156 B2 | 12/2013 | Kamikawa et al. | |
| 8,846,561 B2 | 9/2014 | Otto et al. | |
| 2006/0004135 A1 | 1/2006 | Paquette et al. | |
| 2011/0039999 A1 | 2/2011 | Witt et al. | |
| 2011/0196094 A1 | 8/2011 | Hamad et al. | |
| 2014/0303285 A1 | 10/2014 | Hou | |
| 2015/0073117 A1* | 3/2015 | Alidedeoglu | C08L 67/02 |
| | | | 528/279 |
| 2015/0291733 A1* | 10/2015 | Hess | C08G 63/78 |
| | | | 521/182 |
| 2020/0002487 A1 | 1/2020 | Garcia et al. | |
| 2020/0216660 A1* | 7/2020 | Oh | C08L 67/02 |
| 2021/0380757 A1 | 12/2021 | Kim et al. | |

FOREIGN PATENT DOCUMENTS

| | | |
|---|---|---|
| CN | 110776624 | 2/2020 |
| JP | 2008503613 A | 2/2008 |
| JP | 4231569 B2 | 3/2009 |
| JP | 2013519736 A | 5/2013 |
| JP | 5675587 B2 | 2/2015 |
| JP | 2018145413 A | 9/2018 |
| JP | 2020511565 A | 4/2020 |
| JP | 2021188038 A | 12/2021 |
| KR | 10-2001-0023451 A | 3/2001 |
| KR | 10-0394412 B1 | 11/2003 |
| KR | 10-2014-0050701 A | 4/2014 |
| KR | 10-2015-0104081 A | 9/2015 |
| KR | 10-2017-0076929 A | 7/2017 |
| KR | 10-1897180 B1 | 9/2018 |
| WO | 96/27616 A1 | 9/1996 |

OTHER PUBLICATIONS

Wei et al (CN 104479317), English translation published on Apr. 1, 2015.*
Keith D. Hendren et al., "In situ dispersion and polymerization of polyethylene cellulose nanocrystal-based nanocomposites", Journal of Applied Polymer Science, 2020, vol. 137, No. 13, 48500, pp. 1-10.

* cited by examiner

*Primary Examiner* — Gregory Listvoyb
(74) *Attorney, Agent, or Firm* — Bryan Cave Leighton Paisner LLP

(57) ABSTRACT

A method for producing a biodegradable polymer complex and the biodegradable polymer complex are provided. The method comprises preparing a monomer mixture containing adipic acid and terephthalic acid; mixing an organic filler, 1,4-butanediol and a catalyst to prepare a catalyst mixture; and mixing the monomer mixture and the catalyst mixture and performing an esterification reaction. The method provides the biodegradable polymer complex having improved biodegradability with high efficiency and low cost, and excellent mechanical properties.

12 Claims, No Drawings

METHOD FOR PRODUCING BIODEGRADABLE POLYMER COMPLEX AND BIODEGRADABLE POLYMER COMPLEX

CROSS CITATION WITH RELATED APPLICATION(S)

This application is a National Stage Application of International Application No. PCT/KR2021/015083, filed on Oct. 26, 2021, which claims priority to Korean Patent Application No. 10-2020-0139328 filed on Oct. 26, 2020 and Korean Patent Application No. 10-2021-0143059 filed on Oct. 25, 2021, the disclosures of which are incorporated herein by reference in their entireties.

FIELD

The present disclosure relates to a method for producing a biodegradable polymer complex having excellent mechanical properties, and a biodegradable polymer complex having excellent mechanical properties.

BACKGROUND

Polyester-based resin is excellent in mechanical and chemical properties, and thus is used for many purposes, and for example, it have been conventionally applied to the fields of drinking water containers and medical applications, food wrapping paper, food containers, sheets, films, vehicle molded articles, and the like.

Among them, since polybutylene adipate terephthalate (PBAT) is a soft polyester that is biodegradable, it is in the spotlight as an alternative to polyolefin polymers mainly used in packaging materials and agricultural films due to recent environmental regulations.

However, since the mechanical properties of PBAT are slightly insufficient to use soft PBAT alone for this purpose, PBAT is mainly used by blending with light polylactic acid (PLA); PBAT is used alone, but is used by compounding an organic filler such as carbon black.

However, when blended with PLA, the degree of biodegradability is lowered compared to that of PBAT alone, and since PBAT and PLA are incompatible with each other, there is a drawback that a compatibilizer needs to be added. In addition, when PBAT is used alone by compounding with an organic filler, mixing by an extruder is utilized. Such physical mixing has a limit in dispersing the organic filler and thus, an excess amount is often added than the actual required amount, and it is common to make and mix a masterbatch with a high content of organic filler.

SUMMARY

The present disclosure provides a method for producing a biodegradable polymer complex having excellent mechanical properties, and a biodegradable polymer complex having excellent mechanical properties.

In one embodiment of the present disclosure, there is provided a method for producing an organic filler and polybutylene adipate terephthalate (PBAT), comprising the step of preparing a catalyst mixture in the presence of an organic filler and then charging the mixture into a polymerization system.

In another embodiment of the present disclosure, there is provided a biodegradable polymer complex, comprising: a polybutylene adipate terephthalate; and an organic filler dispersed between polymer chains of the polybutylene adipate terephthalate.

According to the production method of the one embodiment, even if used alone without post-process, a biodegradable polymer complex having excellent mechanical properties can be provided with high efficiency and low cost.

In addition, the biodegradable polymer complex of one embodiment has excellent biodegradability because the crystallinity is controlled according to the content of the organic filler.

DETAILED DESCRIPTION

The technical terms used herein is for the purpose of describing exemplary embodiments only and is not intended to limit the scope of the invention. The singular forms "a," "an" and "the" are intended to include plural forms, unless the context clearly indicates otherwise. It should be understood that the terms "comprise," "include", "have", etc. are used herein to specify the presence of stated features, integers, steps, components or combinations thereof, but do not preclude the presence or addition of one or more other features, integers, steps, components, or combinations thereof.

Although the present disclosure may have various forms and various modifications can be made thereto, specific examples will be exemplified and explained in detail. However, it is not intended to limit the present disclosure to disclosed forms, and it should be understood that all the modifications, equivalents or substitutions within the idea and technical scope of the present disclosure are included in the present disclosure.

Now, specific embodiments of the present disclosure will be described in more detail.

Method for Producing a Biodegradable Polymer Complex

According to an embodiment of the present disclosure, there is provided a method for producing a biodegradable polymer complex, comprising the steps of: preparing a monomer mixture containing adipic acid and terephthalic acid; mixing an organic filler, 1,4-butanediol and a catalyst to prepare a catalyst mixture; and mixing the monomer mixture and the catalyst mixture and performing an esterification reaction.

According to the production method of the one embodiment, polybutylene adipate terephthalate complexed by in-situ polymerization with an organic filler can be provided, which can exhibit sufficient physical properties even when used alone.

Therefore, according to the production method of the one embodiment, unlike polybutylene adipate terephthalate polymerized in the absence of an organic filler, a biodegradable polymer complex having improved biodegradability can be provided with high efficiency and low cost, while exhibiting sufficient physical properties, even when used alone without post-process.

Here, in the biodegradable polymer complex, an organic filler is dispersed and positioned between polymer chains of the polybutylene adipate terephthalate, which is distinguished from a blending resin in which a polymer resin composition of liquid or solid polybutylene adipate terephthalate and an organic filler are simply mixed.

Hereinafter, in some cases, the "biodegradable polymer complex" may be simply abbreviated as "complex".

Production Process of Catalyst Mixture

In the production process of the catalyst mixture, 1,4-butanediol and a catalyst are mixed together with an organic filler to produce a catalyst mixture. By this process, the catalyst mixture in which the organic filler is uniformly dispersed can be supplied to the polymerization system.

When such an organic filler is polymerized together with polymers such as PBAT, in order to effectively improve the physical properties, it is necessary to uniformly disperse the organic filler between newly formed polymer chains.

In the method according to an example of the present disclosure, a catalyst mixture is produced by a method of first reacting an organic filler such as cellulose with a catalyst, and the catalyst mixture thus produced is charged into a polymerization reaction. In this case, the organic filler may be more uniformly dispersed in the process of forming the PBAT polymer chain, compared to the case where the polymerization reaction product, the polymerization catalyst, and the organic filler are added at the same time, According to the method of one example of the present disclosure, the organic filler and the catalyst material are pre-mixed, whereby the catalyst is distributed on the surface of the organic filler. More specifically, a transesterification reaction proceeds between various types of functional groups contained in the organic filler molecule and the catalyst molecule, and this transesterification reaction is limited to some extent due to steric hindrance of the organic filler molecules, whereby a catalyst-organic filler complex in the form of coating the surface of the organic filler with a catalyst molecule may be formed.

Generally, the organic filler may cause intramolecular aggregation of organic filler due to an intramolecular functional group, its morphology, or the like. According to the method of an example of the present disclosure, as described above, the surface of the organic filler is coated with catalyst molecules, and thus can prevent a phenomenon where the organic filler molecules overlap or aggregate with each other. By this principle, the organic filler molecules are dispersed with each other, whereby even in the polymerization process in which PBAT polymer chains are formed, the organic filler can be more uniformly dispersed in the polymer.

Thereby, during the polymerization reaction, the polymer chain grows centered on the surface of the organic filler, so that the organic filler can be uniformly distributed between the polymer chains to such an extent that the polymer chains and the organic filler are not separated from each other.

Further, according to this method, the organic filler can be uniformly dispersed between the polymer chains, to thereby prevent crystallization of the polymer chains and producing a polymer complex having a low crystallinity.

Further, in this process, clusters of catalysts are partially broken in advance, and the reaction sites can be increased to prepare a partially activated catalyst. By supplying the partially activated catalyst in this way, the initial reaction rate of the polymerization system can be increased, and the polymerization time can be reduced.

The step of preparing the catalyst mixture can be performed in a temperature range of 40 to 240° C. for 10 to 120 minutes.

Within the above temperature and time range, a catalyst mixture in which the organic filler is uniformly dispersed can be prepared. Further, the catalyst clusters are broken to create the maximum number of reaction sites, and a catalyst may be coated onto the surface of the organic filler to appropriately mediate the polymerization reaction of the monomer and the prepolymer described later.

However, if the temperature at the time of producing the catalyst mixture is too low, the dispersibility of the organic filler decreases and 1,4-butanediol crystallizes, which may cause a problem in miscibility and/or reactivity. Unlike this, if the temperature is too high during the production of the catalyst mixture, the thermal stability of the catalyst may decrease and thus discoloration of the final PBAT may occur.

On the other hand, if the preparation time of the catalyst mixture is too short, the activation occurs insufficiently, and if the preparation time of the catalyst mixture is too long, polymerization of 1,4-butanediol may proceed or discoloration of the final PBAT may occur.

In consideration of such a tendency, the temperature at the time of preparing the catalyst mixture may be adjusted. For example, the step of preparing the catalyst mixture may be performed within a temperature range of 40° C. or more, 50° C. or more, or more, or 70° C. or more, and 240° C. or less, 200° C. or less, 140° C. or less, or 90° C. or less. Further, the step may be performed within a time range of 10 minutes or more, minutes or more, 20 minutes or more, or 25 minutes or more, and 120 minutes or less, minutes or less, 60 minutes or less, and 40 minutes or less.

The catalyst in the catalyst mixture may be contained in an amount of 0.001 to parts by weight based on 100 parts by weight of said adipic acid in the monomer mixture.

Within the above range, the esterification reaction of the monomer mixture and the polymerization of the esterification reaction product (i.e., prepolymer) can be appropriately mediated.

However, if the charging amount of the catalyst at the time of preparing the catalyst mixture is too small, the polymerization time may become long, and the productivity may be reduced. Unlike this, if the charging amount of the catalyst is too large, the polymerization time may be shortened, but the possibility of discoloration of the final PBAT increases. Therefore, the charging amount of the thermal stabilizer must be increased in proportion to the charging amount of the catalyst, which leads to an increase in the manufacturing cost.

In consideration of such a tendency, the amount of catalyst charged in the catalyst mixture may be adjusted. For example, the catalyst in the catalyst mixture can be used in an amount of 0.001 parts by weight or more, 0.005 parts by weight or more, or 0.01 parts by weight or more, and 10 parts by weight or less, 5 parts by weight or less, or 0.1 parts by weight or less, based on 100 parts by weight of said adipic acid in the monomer mixture.

The organic filler in the catalyst mixture may be contained in an amount of 0.5 to 20 g, or 1.0 to 20 g, or 1.5 to 17 g, or 1.5 to 5 g, or 1.5 to 3 g, per 1 mmol of the catalyst.

Within the above range, the reinforcing effect by the organic filler and the reaction mediating effect by the catalyst can be balanced.

However, if the charging amount of the organic filler is too low compared to the catalyst, the reinforcing effect due to the interaction of the above-mentioned organic filler and catalyst appears insufficiently, and if the charging amount of the organic filler is too large, non-uniform dispersion may occur and the catalyst activity may deteriorate.

Meanwhile, the content of said 1,4-butanediol in the catalyst mixture may be 150 to 250 parts by weight based on 100 parts by weight of said adipic acid in the monomer mixture.

The amount above is the total amount of 1,4-butanediol required for PBAT synthesis. 1,4-butanediol is a reactant, and at the same time, can also serve as a solvent or dispersant for dispersing the organic filler. In the conventional case, only a part of 1,4-butanediol to be reacted is supplied for uniformity and stability of the catalyst during the polymerization process, and the remaining amount is often supplied during a subsequent reaction. However, in the preparation method according to an embodiment of the present disclosure, the entire amount of 1,4-butanediol to be reacted can be supplied to the catalyst mixture to enhance the dispersibility of the organic filler described later.

From this point of view, the content of said 1,4-butanediol in the catalyst mixture may be 150 to 250 parts by weight based on 100 parts by weight of said adipic acid in the monomer mixture.

For example, the content of said 1,4-butanediol in the catalyst mixture may be 180 to 220 parts by weight based on 100 parts by weight of said adipic acid in the monomer mixture.

The organic filler is not particularly limited as long as it is widely used as a polymer reinforcing material in the technical field to which the present disclosure belongs.

Specifically, the organic filler may include, for example, cellulose, a starch-based compound, and the like. As the cellulose and the starch-based compound, those substituted with an alkyl group, or a hydroxy group, or a carboxy group, or a hydroxyalkyl group, or a carboxyalkyl group can also be used.

The catalyst is not particularly limited as long as it is widely used as a polyester polymerization catalyst in the technical field to which the present disclosure belongs.

Specifically, the catalyst may be at least one selected from the group consisting of titanium methoxide, titanium ethoxide, titanium propoxide, titanium isopropoxide, titanium butoxide, and titanium isobutoxide.

For example, the catalyst may be titanium butoxide.
Production Process of Prepolymer The prepolymer refers to a polymer having a relatively low degree of polymerization in which the polymerization reaction is stopped at the middle stage in order to facilitate molding.

In one embodiment, the prepolymer corresponds to a polymer having a relatively low degree of polymerization, which is produced by esterifying a monomer mixture including adipic acid and terephthalic acid in the presence of the catalyst mixture.

According to an embodiment of the present disclosure, in the process of forming the prepolymer, an initial polymer chain may be formed around the surface of the organic filler, centering on the catalyst coated onto the surface of the organic filler.

Specifically, the monomer mixture can be contained in an amount of 50 to 150 parts by weight of the terephthalic acid based on 100 parts by weight of said adipic acid in the monomer mixture.

Terephthalic acid may affect the crystallinity of the polymer due to its aromatic ring structure, and both the mechanical properties and biodegradability of the polymer produced within the above charging range may be satisfactorily realized.

For example, the monomer mixture can be contained in an amount of 80 to 120 parts by weight of terephthalic acid based on 100 parts by weight of said adipic acid in the monomer mixture.

In the step of producing the prepolymer, an esterification reaction can be performed by adding 0.1 to 1 part by weight of a crosslinking agent or a branching agent, based on 100 parts by weight of said adipic acid in the monomer mixture.

When the esterification reaction is performed by adding a crosslinking agent, an internally crosslinked prepolymer may be produced, and the mechanical properties of the final complex may be improved.

The crosslinking agent is a low-molecular compound including 3 or more hydroxy groups in a molecule or 3 or more carboxy groups in a molecule, and for example, glycerol or citric acid may be used. For example, the crosslinking agent may be glycerol.

The step of producing the prepolymer; may be performed at a temperature range of 150 to 350° C. for 10 to 120 minutes.

In the above temperature and time range, the prepolymer can be produced while maintaining a uniform dispersion of the organic filler.

For example, the step of producing the prepolymer can be performed within the temperature range of 150° C. or more, 170° C. or more, 190° C. or more, or 210° C. or more, and 350° C. or less, 320° C. or less, 290° C. or less, or 250° C. or less. Further, it can be performed within the time range of 10 minutes or more, 15 minutes or more, 20 minutes or more, or 25 minutes or more, and 120 minutes or less, 90 minutes or less, 60 minutes or less, 40 minutes or less.

In the step of producing the prepolymer, nitrogen gas may be injected. Specifically, by rapidly removing water generated as a by-product when injecting nitrogen gas, the reverse reaction due to water can be suppressed, and the conversion rate and molecular weight of the monomer can be increased.

For example, nitrogen gas can be injected at (0.001) ml/min or more, (0.01) ml/min or more, (0.02) ml/min or more, or (0.05) ml/min or more, and (100) ml/min or less, (50) ml/min or less, (10) ml/min or less, or (5) ml/min or less.

During the polymerization of the prepolymer, 0.001 to 10 parts by weight of a catalyst may be further added based on 100 parts by weight of said adipic acid in the monomer mixture.

The catalyst charged first is highly likely to cause the lowering of activity in the prepolymer production stage. For example, titanium, which is the central metal component of the catalyst, may react with water, which is a by-product of the esterification reaction, to form titanium oxide, and a functional group present in the above-mentioned organic filler molecule may be substituted at the alkoxide moiety of the titanium alkoxide. Therefore, it may be preferable to additionally add a catalyst just before the reaction.

For example, the additionally added catalyst can be used in an amount of 0.001 parts by weight or more, 0.005 parts by weight or more, or 0.01 parts by weight or more, and 10 parts by weight or less, 5 parts by weight or less, or 0.1 parts by weight or less based on 100 parts by weight of said adipic acid in the monomer mixture.

After the catalyst is additionally added, a heat stabilizer may be added. When the heat stabilizer is added, discoloration of the final PBAT can be suppressed.

Specifically, 0.001 to 1 part by weight of the heat stabilizer may be added, based on 100 parts by weight of said adipic acid in the monomer mixture.

For example, the heat stabilizer may be added in an amount of 0.001 parts by weight or more, 0.005 parts by weight or more, 0.08 parts by weight or more, or 0.01 parts by weight or more, and 1 part by weight or less, 0.6 parts by weight or less, 0.3 parts by weight or less, or 0.1 parts by weight or less, based on 100 parts by weight of said adipic acid in the monomer mixture.

During the polymerization of the prepolymer, a step of raising the temperature of the reactor containing the prepolymer until it reaches the range of 150 to 350° C.; a step of reducing the pressure in the reactor until it reaches 0.1 to 0.00001 atm after the temperature rise; and a step of terminating the reaction after 2 to 8 hours while maintaining the pressure and temperature after the reduced pressure can be included.

For example, the temperature of the reactor including the prepolymer may be increased until it reaches the temperature range of 150° C. or more, 170° C. or more, 190° C. or more, or 210° C. or more, and 350° C. or less, 320° C. or less, 290° C. or less, or 250° C. or less.

After 1 to 10 minutes after reaching the above temperature range, the pressure in the reactor may be reduced until it reaches a pressure range of 0.00001 atm or more, atm or more, 0.0001 atm or more, or 0.0002 atm or more, and 0.1 atm or less, atm or less, 0.03 atm or less, or 0.01 atm or less.

After the pressure reduction, reaction is performed while maintaining the pressure and temperature, and the reaction may be terminated after 2 minutes or more, 2.2 hours or more, 2.4 hours or more, or 3 hours or more, and 8 hours or less, 7.5 hours or less, 7 hours or less, or 6 hours after the start of the reaction.

Biodegradable Polymer Complex

In another embodiment of the present disclosure, there is provided a biodegradable polymer complex, comprising: a polybutylene adipate terephthalate containing a repeating unit derived from 1,4-butanediol, a repeating unit derived from adipic acid, and a repeating unit derived from terephthalic acid; and an organic filler dispersed between polymer chains of the polybutylene adipate terephthalate.

The complex of one embodiment is produced by the production method of the embodiment described above, and can exhibit sufficient physical properties even when used alone without a post-process, such as mixing with a reinforcing material.

Further, the composite may be one in which the crystallinity is controlled according to the content of the organic filler, and the biodegradability is improved.

In the case of the biodegradable polymer complex according to an embodiment of the present disclosure, the acid value is an equivalent level to that of a biodegradable polymer polymerized in an environment where organic fillers do not exist, and the acid number according to DIN EN 12634 may be between 1.8 and 3 mg KOH/g. For example, the complex may have an acid value of 1.8 mg KOH/g or more, and 3 mg KOH/g or less, 2.6 mg KOH/g or less, or 2.5 mg KOH/g or less according to DIN EN 12634.

The acid value is the number of mg of KOH required to neutralize the free fatty acids contained in 1 g of oil. RCOOH+KOH→RCOOK+H₂O, that is, the acid value is to measure the amount of free fatty acid in which fatty acid does not exist in a bound form as glycerides.

Particularly, in the esterification reaction, the acid value is a measure that shows the degree of the reaction, and refers to the amount of KOH required to neutralize the carboxyl group contained in 1 g of the polymer, which is a factor indicating that the higher the number, the poorer the reaction rate.

Here, the acid number can be measured according to DIN EN 12634. Specifically, a sample is dissolved in a mixed solution of O-cresol:chloroform in a 1:1 weight ratio, an aqueous solution in which 0.1 wt. % of phenol red is dissolved is used as an indicator of 1-2 drops, a 0.1N potassium hydroxide (KOH)/ethanol solution is titrated using a micropipette, and the acid value can be measured according to the following Equation 1.

$$\text{Acid value(mg KOH/g)} = (V-V0) \times M \times F \times 1000/W \qquad \text{[Equation 1]}$$

V: volume of KOH/ethanol solution consumed for sample titration (mL)

V0: volume of KOH/ethanol solution consumed for titration in blank test (mL)

M: molar concentration of KOH/ethanol solution (0.1M/L)

W: mass of sample (g)

F: titer of KOH/ethanol solution

Further, the biodegradable polymer complex according to an embodiment of the present disclosure may have a crystallinity of 20 to 27% as measured using a differential scanning calorimeter. Within this range, irrespective of the type of organic filler, as the content of the organic filler increases, the crystallinity may further decrease and the biodegradability may increase.

The crystallinity can be calculated by the weight fraction of the crystal portion with respect to the whole resin. As the crystallinity is higher (that is, as the number of crystals increases), the strength of the polymer tends to be higher, which is a factor that can predict the strength. In particular, in the case of a biodegradable polyester-based resin, it is known that the higher the crystallinity, the lower the degree of biodegradation, which is a factor that can roughly predict the degree of biodegradation.

In the biodegradable polymer complex of one embodiment, crystals may not grow completely due to steric hindrance by an organic filler in a process of crystallization of molten PBAT by cooling, and the crystallinity may be low, unlike PBAT polymerized in the absence of organic fillers.

Here, the crystallinity can be measured using a differential scanning calorimeter. Specifically, 1st heating, 1st cooling, and 2nd heating in a temperature range (−70 to 200 degrees, 10 degrees/min) are performed sequentially using a differential scanning calorimeter (DSC, device name: DSC 2500, manufacturer: TA Instrument), and the crystallinity can be calculated using the heat of fusion of the melting transition (using PBAT $\Delta Hm0=114$ J/g) during 2nd heating.

The biodegradable polymer complex of one embodiment may have a tensile strength value of 400 kgf/cm² to 550 kgf/cm² according to ASTM D 882.

At this time, the MD tensile strength is 400 to 450 kgf/cm², specifically 410 to 450 kgf/cm², for example, 410 to 430 kgf/cm², and the TD tensile strength may be 400 to 550 kgf/cm², specifically 430 to 550 kgf/cm², for example, 430 to 500 kgf/cm².

The tensile strength (max stress) may be measured according to ASTM D 882 by producing a molded article containing the biodegradable polymer complex as a blown film specimen. Specifically, the tensile strength can be measured by conducting a tensile test on each film sample at a tensile test at a stretching rate of 10 mm/min using a universal testing machine (UTM) manufactured by Instron.

The tensile test conditions apply load cell 10KN, LE position 40 mm, and the maximum stress value of the S-S curve can be measured for the machine-direction (MD), which is MD, and the transverse-direction (TD), which is TD, respectively.

Polybutylene adipate terephthalate in the biodegradable polymer complex of one embodiment may contain 150 to 250 parts by weight of the 1,4-butanediol-derived repeating unit, and 50 to 150 parts by weight of the terephthalic acid-derived repeating unit, based on 100 parts by weight of the adipic acid-derived repeating unit.

If the 1,4-butanediol content is too high, it is effective for the esterification reaction rate when it is high, but there is a limit to increasing the molecular weight of the polymer, and the amount of THF produced by side reactions increases, which economically inefficient. In addition, if the charging ratio of terephthalic acid to adipic acid is increased, the processability and biodegradability may decrease.

For example, polybutylene adipate terephthalate in the biodegradable polymer complex of one embodiment may contain 180 to 220 parts by weight of the 1,4-butanediol-derived repeating unit and 80 to 120 parts by weight of the terephthalic acid-derived repeating unit based on 100 parts by weight of the adipic acid-derived repeating unit.

Further, the biodegradable polymer complex of one embodiment may contain 0.001 to 10 parts by weight of the organic filler based on 100 parts by weight of the repeating unit derived from said adipic acid in the polybutylene adipate terephthalate.

Molded Article

In another embodiment of the present disclosure, there is provided a molded article comprising the above-mentioned biodegradable polymer complex.

The molded article of the embodiment is not particularly limited in its use, but can be widely used in food wrapping paper, bottles, films, sheets and the like, which require transparency.

Hereinafter, the present disclosure will be described in more detail with reference to examples according to the present disclosure. However, these examples are presented for illustrative purposes only, and the scope of the present disclosure is not defined thereby.

Preparation of Catalyst Mixture

Comparative Example 1

0.5 mmol of titanium butoxide and 6.77 mol of 1,4-butanediol were mixed, and left at 160° C. for 60 minutes to obtain a catalyst mixture. 0.17 g

Example 1

0.5 mmol of titanium butoxide, 0.847 g of cellulose, and 6.77 mol of 1,4-butanediol were mixed, and reacted at 160° C. for 60 minutes to obtain a catalyst mixture in which 1,4-butanediol and organic filler were dispersed.

Example 2

0.5 mmol of titanium butoxide, 8.47 g of cellulose, and 6.77 mol of 1,4-butanediol were mixed, and reacted at 160° C. for 60 minutes to obtain a catalyst mixture in which 1,4-butanediol and organic filler were dispersed.

Example 3

0.5 mmol of titanium butoxide, 0.847 g of starch, and 6.77 mol of 1,4-butanediol were mixed, and reacted at 160° C. for 60 minutes to obtain a catalyst mixture in which 1,4-butanediol and organic filler were dispersed.

Example 4

0.5 mmol of titanium butoxide, 8.47 g of starch, and 6.77 mol of 1,4-butanediol were mixed, and reacted at 160° C. for 60 minutes to obtain a catalyst mixture in which 1,4-butanediol and organic filler were dispersed.

Preparation of Prepolymer

A monomer mixture in which 303 g of adipic acid, 317 g of terephthalic acid, and 0.88 g of glycerol were mixed, and the catalyst mixture of Examples and Comparative Examples were charged into a reactor.

The temperature of the reactor into which the reactants were charged was maintained at 230° C., and then nitrogen gas was flowed at a flow rate of 2 cc/min for 240 minutes to prepare a prepolymer while removing by-reactants.

Comparative Example 2

Preparation of Prepolymer 610 g of 1,4-butanediol, 0.847 g of cellulose, 303 g of adipic acid, 317 g of terephthalic acid, 0.88 g of glycerol and 0.17 g of titanium butoxide were charged into a reactor. The temperature of the reactor was maintained at 230° C., and then nitrogen gas was flowed at a flow rate of 2 cc/min for 240 minutes to prepare a prepolymer while removing by-reactants.

Comparative Example 3

Preparation of Prepolymer 610 g of 1,4-butanediol, 8.47 g of cellulose, 303 g of adipic acid, 317 g of terephthalic acid, 0.88 g of glycerol and 0.17 g of titanium butoxide were charged into a reactor. The temperature of the reactor was maintained at 230° C., and then nitrogen gas was flowed at a flow rate of 2 cc/min for 240 minutes to prepare a prepolymer while removing by-reactants.

Preparation of Biodegradable Polymer Complex 0.5 mmol of titanium butoxide as a catalyst was additionally charged into ae reactor in which the prepolymer was prepared, and the mixture was stirred at 60 rpm for 10 minutes.

After the stirring, 0.09 g of a heat stabilizer (triethylphosphonoacetate) was added, and then stirred at 60 rpm for 10 minutes.

Then, the temperature of the reactor was raised until it reached 240° C. After 5 minutes have passed from the time when the temperature reached 240° C., the pressure was reduced until the internal pressure of the reactor reached 0.001 atm. While maintaining the reduced pressure, stirring was continued at 60 rpm to proceed with polymerization. After 210 minutes from the start of polymerization, the stirring was stopped and the reactor was disassembled to finally obtain a biodegradable polymer complex.

Measurement of Weight Average Molecular Weight

The measurement target was dissolved in chloroform at a concentration of 1 mg/ml, and then the solution was charged into a gel permeation chromatography (GPC, PL GPC220, Agilent Technologies) device, and the molecular weight was measured. At this time, polystyrene was used as the standard polymer.

Measurement of Acid Number

A sample was dissolved in a mixed solution of O-cresol: chloroform in a 1:1 weight ratio, an aqueous solution in which 0.1 wt. % of phenol red was dissolved was used as an indicator of 1-2 drops, 0.1N potassium hydroxide (KOH)/ethanol solution was titrated using a micropipette, and the acid value was measured according to the following Equation 1.

$$\text{Acid value(mg KOH/g)}=(V-V0)\times M\times F\times 1000/W \qquad \text{[Equation 1]}$$

V: volume of KOH/ethanol solution consumed for sample titration (mL)

V0: volume of KOH/ethanol solution consumed for titration in blank test (mL)

M: molar concentration of KOH/ethanol solution (0.1M/L)

W: sample mass (g)

F: titer of KOH/ethanol solution

The acid value is the number of mg of KOH required to neutralize the free fatty acids contained in 1 g of oil. $RCOOH+KOH \rightarrow RCOOK+H_2O$, that is, the acid value is to measure the amount of free fatty acid in which fatty acid does not exist in a bound form as glycerides.

Particularly, in the esterification reaction, the acid value is a measure that shows the degree of the reaction, and refers to the amount of KOH required to neutralize the carboxyl group contained in 1 g of the polymer, which is a factor indicating that the higher the number, the poorer the reaction rate.

TABLE 1

|  | Weight average molecular weight (10,000 g/mol) | Acid value (mgKOH/g) |
|---|---|---|
| Example 1 | 7.24 | 2.09 |
| Example 2 | 7.28 | 2.33 |
| Example 3 | 7.30 | 2.20 |
| Example 4 | 7.19 | 2.28 |
| Comparative Example 1 | 7.15 | 2.31 |
| Comparative Example 2 | 7.08 | 2.41 |
| Comparative Example 3 | 7.36 | 2.19 |

It was shown that in the case of Comparative Examples and Examples, an acid value capable of judging the tendency of the polymerization reaction, and the weight average molecular weight values were almost the equivalent level.

Evaluation of Crystallinity and Mechanical Properties

The crystallinity and mechanical properties of the biodegradable polymer complex according to the above Examples and Comparative Examples were measured, and the results are summarized in Table below.

Specifically, the method for measuring the crystallinity is as follows.

Crystallinity

For the biodegradable polymer complexes of Examples 1 to 4 and the PBATs of Comparative Examples 1 to 3, respectively, 1st heating, 1st cooling, and 2nd heating were sequentially performed in the temperature range (−70 to 200 degrees, 10 degrees/min) Using a differential scanning calorimeter (DSC, device name: DSC 2500, manufacturer: TA Instrument), and the crystallinity was calculated using the heat of fusion of the melting transition (using PBAT $\Delta Hm0=114$ J/g) during 2nd heating.

Preparation of Specimen

The biodegradable polymer complexes of Examples and Comparative Examples were subjected to inflation molding using a single screw extruder (Shinhwa Industry Co., Ltd., Blown Film M/C, 50 pie, L/D=20) at the extrusion temperature of 130° C. to 170° C. to a thickness of about 50 μm, thereby preparing a blown film. In this regard, the die gap was 2.0 mm, and the blown-up ratio was 2.3.

Tensile Strength (Max Stress)

Each film specimen was subjected to a tensile test at a stretching rate of 10 mm/min using an Instron universal testing machine (UTM) according to ASTM D 882, to measure the tensile strength. In this case, the tensile test conditions applied load cell 10KN, LE position 40 mm, and the maximum stress value of the S-S curve was measured for the machine-direction (MD), which is MD, and the transverse-direction (TD), which is TD, respectively.

TABLE 2

|  | Crystallinity (%) | Tensile strength (kgf/cm²) | |
|---|---|---|---|
|  |  | MD | TD |
| Example 1 | 25 | 420 | 435 |
| Example 2 | 21 | 425 | 490 |
| Example 3 | 26 | 410 | 450 |
| Example 4 | 22 | 420 | 475 |
| Comparative Example 1 | 29 | 340 | 380 |
| Comparative Example 2 | 29 | 360 | 360 |
| Comparative Example 3 | 34 | 375 | 345 |

The crystallinity can be calculated by the weight fraction of the crystal portion with respect to the whole resin. As the crystallinity is higher (that is, as the number of crystals increases), the strength of the polymer tends to be higher, which is a factor that can predict the strength. In particular, in the case of a biodegradable polyester-based resin, it is known that the higher the crystallinity, the lower the degree of biodegradation, which is a factor that can roughly predict the degree of biodegradation.

PBAT of the Comparative Examples has a crystallinity of about 29% to about 34%, and the biodegradable polymer complexes of Examples 1 to 4 containing the organic filler tend to slightly decrease in crystallinity compared to Comparative Examples.

The reason that the crystallinity value in Examples of the present disclosure is slightly reduced compared to Comparative Examples is that in the process of crystallization of molten PBAT by cooling, the crystal does not grow completely due to steric hindrance by the organic filler.

In addition, the slight decrease in crystallinity also means a slight increase in biodegradability. It is confirmed that in Examples 1 to 4 containing the organic filler, as the content of the organic filler increases, the degree of crystallinity further decreases, irrespective of the type of organic filler. Through this, it can be seen that the crystallinity and the degree of biodegradation can be controlled by adjusting the content of the organic filler.

In addition, the biodegradable polymer complexes of Examples 1 to 4 containing the organic filler showed a significant increase in horizontal and TD tensile strength compared to the PBAT of Comparative Example.

In particular, in Examples 1 to 4, the horizontal and TD tensile strength showed the tendency to increase as the organic filler content increased, regardless of the type of organic filler.

Such a tendency is considered to be due to a relatively increased amorphous portion as the degree of crystallinity decreases.

By adjusting the content of the organic filler with reference to the tendencies of Examples 1 to 4, the biodegradability and mechanical properties of the biodegradable polymer complex can be adjusted to a desired range.

However, this is only an example, and as long as the above-described series of processes are used, a biodegradable polymer complex with improved biodegradability can be provided while expressing sufficient physical properties with high efficiency and low cost, even if used alone without post-process, unlike polybutylene adipate terephthalate polymerized in the absence of organic fillers.

The invention claimed is:

1. A method for producing a biodegradable polymer complex, the method comprising:

preparing a monomer mixture containing adipic acid and terephthalic acid;

mixing an organic filler, 1,4-butanediol and a catalyst to prepare a catalyst mixture; and mixing the monomer mixture and the catalyst mixture, and performing an esterification reaction, wherein the catalyst is at least one selected from the group consisting of titanium methoxide, titanium ethoxide, titanium propoxide, titanium isopropoxide, titanium butoxide, and titanium isobutoxide, and wherein the organic filler is at least one selected from the group consisting of cellulose and a starch-based compound.

2. The method according to claim 1, wherein said 1,4-butanediol in the catalyst mixture is contained in an amount of 150 to 250 parts by weight based on 100 parts by weight of said adipic acid in the monomer mixture.

3. The method according to claim 1, wherein the catalyst in the catalyst mixture is contained in an amount of 0.001 to 10 parts by weight based on 100 parts by weight of said adipic acid in the monomer mixture.

4. The method according to claim 1, wherein the organic filler in the catalyst mixture is contained in an amount of 0.01 to 10 parts by weight based on 100 parts by weight of said adipic acid in the monomer mixture.

5. The method according to claim 1, wherein the organic filler in the catalyst mixture is contained in an amount of 0.5 to 20 g per 1 mmol of the catalyst.

6. The method according to claim 1, wherein the monomer mixture contains 50 to 150 parts by weight of said terephthalic acid based on 100 parts by weight of said adipic acid in the monomer mixture.

7. The method according to claim 1, wherein the step of performing an esterification reaction comprises:

preparing a prepolymer; and polymerizing the prepolymer to obtain a biodegradable polymer complex.

8. The method according to claim 7, wherein:

0.001 to 10 parts by weight of a catalyst is further added based on 100 parts by weight of said adipic acid in the monomer mixture during polymerization of the prepolymer.

9. A biodegradable polymer complex produced by the method of claim 1, the biodegradable polymer complex comprising:

polybutylene adipate terephthalate containing a repeating unit derived from 1,4-butanediol, a repeating unit derived from adipic acid, and a repeating unit derived from terephthalic acid; and the organic filler dispersed between polymer chains of the polybutylene adipate terephthalate.

10. The biodegradable polymer complex according to claim 9, wherein a crystallinity of the biodegradable polymer complex measured using a differential scanning calorimeter is in a range from 20 to 27%.

11. The biodegradable polymer complex according to claim 9, wherein a tensile strength of the biodegradable polymer complex measured according to ASTM D 882 is in a range from 400 $kgf/cm^2$ to 550 $kgf/cm^2$.

12. A molded article comprising the biodegradable polymer complex as set forth in claim 9.

* * * * *